L. BROWN, DEC'D.
M. A. BROWN, ADMINISTRATRIX.
COMBINED TRACTOR, BINDER, AND PLOW TRUCK.
APPLICATION FILED JAN. 3, 1917.
1,275,123.
Patented Aug. 6, 1918.
3 SHEETS—SHEET 3.
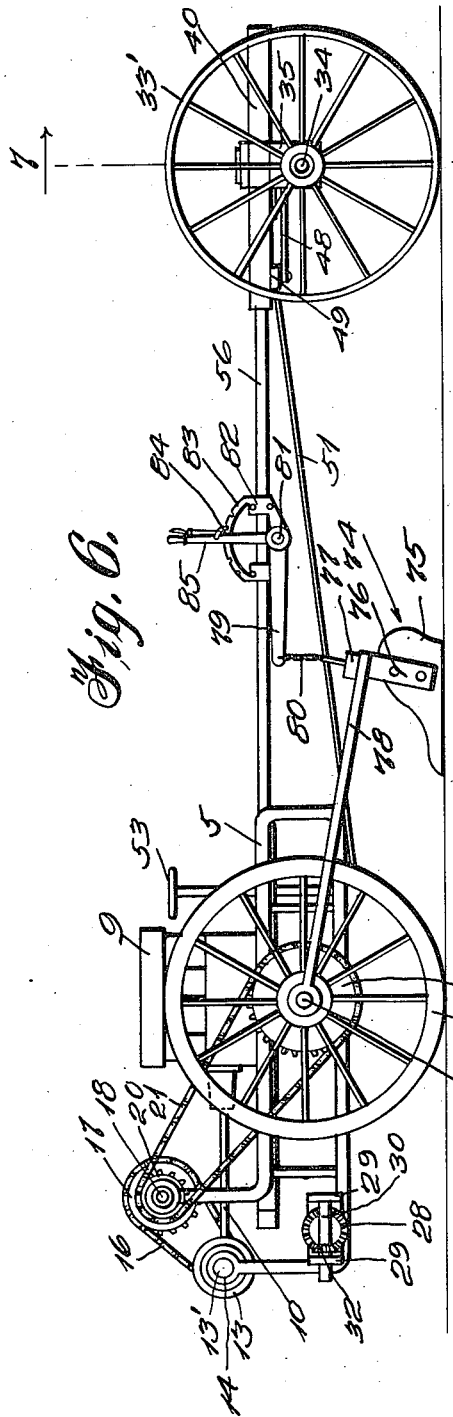
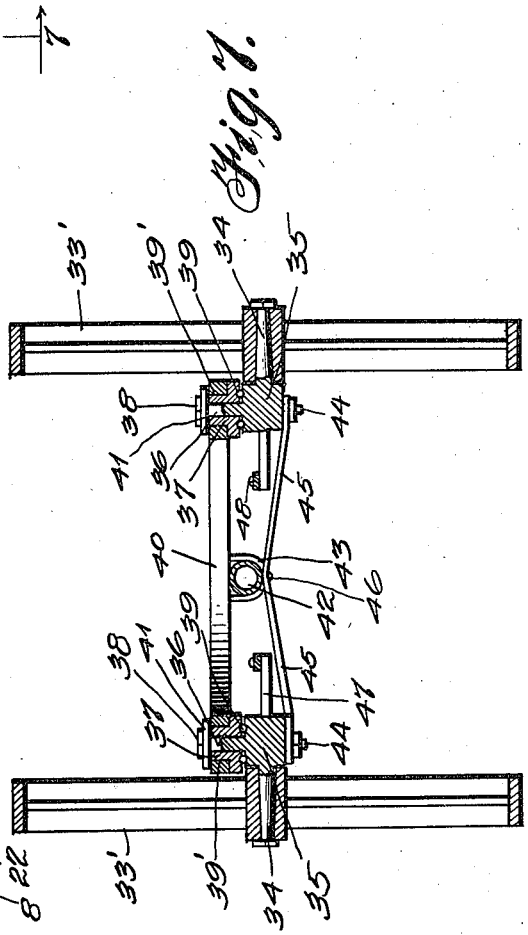
Inventor
Leonard Brown,
By G.W. Earnshaw
Attorney

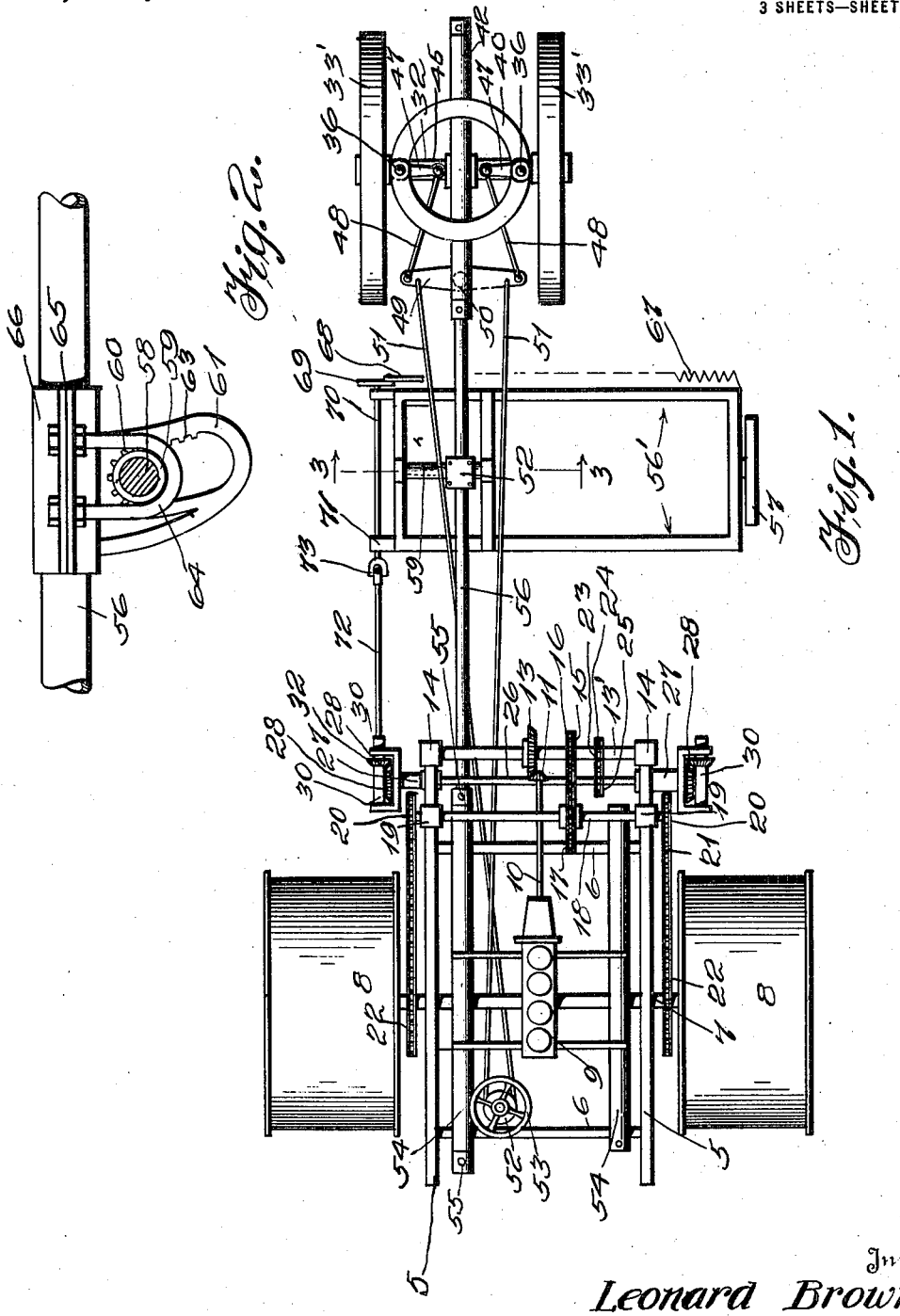

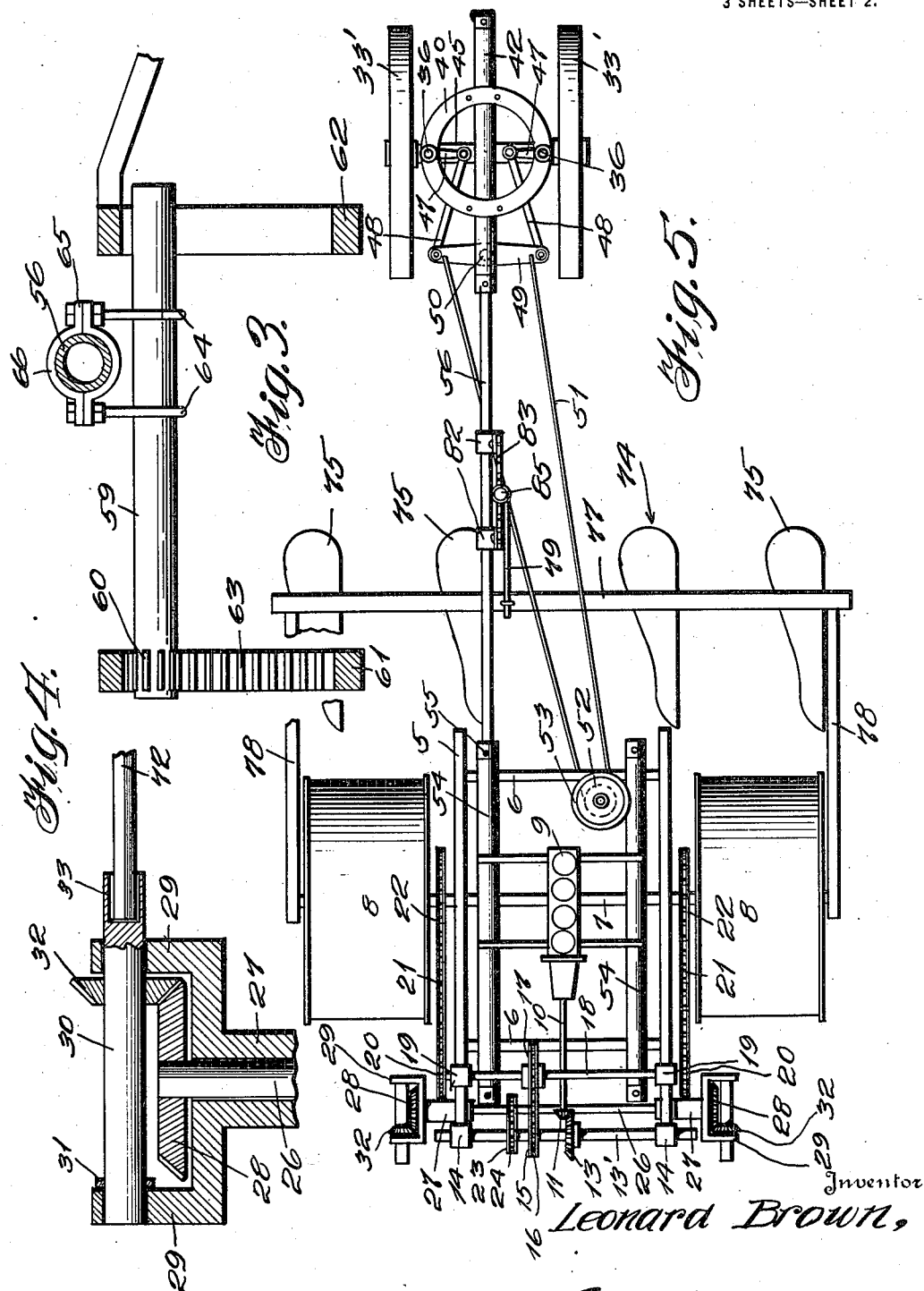

UNITED STATES PATENT OFFICE.

LEONARD BROWN, OF WEBB CITY, MISSOURI; MARY A. BROWN ADMINISTRATRIX OF SAID LEONARD BROWN, DECEASED.

COMBINED TRACTOR, BINDER, AND PLOW-TRUCK.

1,275,123.  Specification of Letters Patent.  Patented Aug. 6, 1918.

Application filed January 3, 1917. Serial No. 140,441.

*To all whom it may concern:*

Be it known that I, LEONARD BROWN, a citizen of the United States, residing at Webb City, in the county of Jasper and State of Missouri, have invented certain new and useful Improvements in Combined Tractors, Binders, and Plow-Trucks, of which the following is a specification.

My invention relates to a combined tractor, binder, and plow truck.

An important object of the invention is to provide apparatus of the above mentioned character, whereby the ordinary binder which is drawn by draft animals may be transformed into a power operated binder.

A further object of the invention is to provide means whereby the binder is attached to the tractor and may be raised and lowered, as desired.

A further object of the invention is to provide a tractor of the above mentioned character, so constructed that the same may be connected with a gang of plows, to operate the same.

A further object of the invention is to provide steering means for the wheels of the tractor, which are simple, strong, and convenient in use.

Other objects and advantages of the invention will be apparent during the course of the following description.

In the accompanying drawings forming a part of this specification and in which like numerals are employed to designate like parts throughout the same, Figure 1 is a plan view of my improved tractor, showing a binder secured thereto, Fig. 2 is a side elevation of apparatus for securing the binder to the pole of the tractor, Fig. 3 is an enlarged detail section taken on line 3—3 of Fig. 1, Fig. 4 is an enlarged detail section through a bearing, Fig. 5 is a plan view of the tractor showing the same adjusted for operating a gang of plows, Fig. 6 is a side elevation of the same, and, Fig. 7 is a transverse vertical section taken on line 7—7 of Fig. 6.

In the drawings, wherein for the purpose of illustration is shown a preferred embodiment of my invention, the numeral 5 designates longitudinal beams of the main frame of the tractor, which are rigidly connected by transverse beams 6, disposed near the ends thereof. This frame is supported upon a rotatable axle 7, suitably connected therewith, and to which are rigidly connected traction wheels 8, as shown.

Arranged preferably centrally of the frame is an engine 9, such as an internal combustion engine, which drives a shaft 10. This shaft is provided at its forward end with a bevel gear 11, rigidly secured thereto. This bevel gear engages and drives a bevel gear 13, rigidly mounted upon a transverse shaft 13', which is journaled through bearings 14, carried by the forward ends of the beams 5. The shaft 13' has a sprocket wheel 15 rigidly mounted thereon, engaged by a rearwardly extending sprocket chain 16, engaging a sprocket wheel 17, rigidly mounted upon a second transverse shaft 18. The shaft 18 is journaled through bearings 19, rigidly mounted upon the beams 5. Rigidly connected with the opposite ends of the shaft 18 are sprocket wheels 20, engaged by rearwardly extending sprocket chains 21, engaging sprocket wheels 22, rigidly mounted upon the axle 7. From the foregoing description it is obvious that the rotation of the shaft 10 is suitably reduced and transmitted to the traction wheels 8.

The shaft 13' has a sprocket wheel 23 rigidly connected therewith, engaged by a rearwardly extending sprocket chain 24, engaging a sprocket wheel 25, which is rigidly mounted upon a counter shaft 26. This counter shaft is journaled through stationary bearings 27, which are rigidly secured to the beams 5, as more clearly shown in Figs. 1 and 4. Rigidly connected with the opposite ends of the counter shaft 26 are bevel gears 28, arranged between apertured ears or bearings 29, rigidly secured to the bearings 27. Rotatably mounted within the apertured ears 29 are stub-shafts 30, held against longitudinal movement in one direction by means of a ring 31, clamped or rigidly secured thereto. The stub-shafts 30 are held against longitudinal movement in an opposite direction by bevel gears 32, which engage the bevel gear 28 and is driven thereby. Each stub-shaft 30 is provided in its forward end with an opening or socket 33, which is formed square in cross-section, for a purpose to be described.

The numeral 33' designates steering wheels, rotatably mounted upon spindles 34, which are rigidly attached to blocks 35, as clearly illustrated in Fig. 7. These blocks carry vertical pins or pivot elements 36, which are rotatably mounted within openings formed in upper blocks or bearings 37. These pins 36 are retained within the openings of the upper bearings by nuts 38 or the like. Bearing balls 39 are preferably interposed between the upper and lower blocks 37 and 35, as shown. The upper bearings or blocks 37 are arranged within openings 39′, formed in an annular bolster 40, and are retained in such openings by washers 41, held in place by the nuts 38. Arranged beneath the annular bolster 40 is a tube or sleeve 42, having both ends open and clamped to the annular bolster by means of U-bolts 43, as shown. The blocks 35 carry depending trunnions or pins 44, pivotally mounted within openings at the ends of a rod 45, which is bolted or rigidly attached to the tube or sleeve 42, as shown at 46.

Rigidly connected with the blocks 35 are inwardly extending steering arms 47, to which are pivotally connected rigid links 48, having pivotal connection with a lever 49, which is in turn arranged beneath and pivoted to the sleeve 42, as shown at 50. The opposite ends of the lever 49 have connection with a cable or cables 51, extending rearwardly and oppositely wound upon a drum 52, so that when one cable is wound thereon the other cable is unwound therefrom. The drum 52 is pivotally mounted upon the frame of the tractor and is turned by a hand wheel 53.

Extending longitudinally of the frame of the tractor are tubes or sleeves 54, which are rigidly secured thereto and have their ends open. Each tube is provided at its ends with clamping screws or bolts 55, for a purpose to be described. Adapted for insertion within the tubes or sleeves 54 is a coupling pole 56, to be held therein by the clamping screw 55. This coupling pole is also adapted to be inserted within the sleeve 42 and to be held therein by a clamping screw or like device. Both ends of the tube or sleeve 42 being open, it is obvious that this sleeve may be readily longitudinally adjusted upon the coupling pole and clamped thereto in adjustment at desired positions.

The numeral 56′ designates a binder frame as a whole. The outer end of this binder frame is supported by a wheel 57, pivotally connected therewith. The binder is provided with a bull shaft 58, the bull wheel being removed. This bull shaft is suspended from the coupling pole 56, in a manner to be described. The bull shaft 58 has a sleeve 59 rotatable thereon and is also provided with a gear 60. This gear operates within a pair of depending guides operates within a pair of depending guides 61 and 62, which are rigidly secured to the binder frame, as more clearly shown in Fig. 3. The guide 61 is provided with gear teeth 63, engaging the gear 60, as shown. The sleeve 59 is suspended by U-bolts 64, engaging the flanges 65 of a two-part clamp 66, and serving to bind the same to the coupling pole 56, as shown. From the foregoing description it is obvious that the U-bolts 64 will securely attach the sleeve 59 and the binder frame to the coupling pole to travel therewith, and that the binder frame may be raised and lowered by a turning movement of the sleeve 59, the pinion 60 traveling up or down upon the gear teeth 63.

The binder comprises a reciprocatory cutter 67, which is moved by a pitman 68, pivotally connected with a disk crank 69. This disk crank is rigidly attached to one end of a shaft 70 journaled through bearings 71, attached to one end of the binder frame, as shown. The binder shaft 70 is connected with a driving shaft 72, by means of a universal joint 73, while the opposite end of this driving shaft 72, which is formed square in cross-section, projects into the socket 33. The socket is constructed slightly larger in cross-section than the driving shaft, to permit of slight upward and downward movements of the driving shaft.

In Figs. 5 and 6, the steering wheels 33′ are arranged rearwardly of the traction wheels 8, and have connection with the tractor through the medium of the coupling pole 56 and associated elements. In these figures the binder is omitted and a gang of plows 74 is arranged behind the traction wheels 8. This gang of plows comprises plow shares 75, attached to standards 76, which are rigidly connected with a transverse bar 77. The ends of this bar are connected with bars or arms 78, apertured at their ends to receive the ends of the axle 7. The transverse bar 77 is connected with a vertically swinging lever 79 by means of a chain 80 or the like. This vertically swinging lever is pivoted at 81, to a two-part clamp 82, which is removably mounted upon the coupling pole 56 and adapted to be clamped thereto. This two-part clamp carries a quadrant 83, having teeth to engage with a latch 84, carried by a lever 85. This lever is rigidly connected with the lever 79 to move it. It is thus apparent that by proper movement of the lever 85, the lever 79 will be moved and the plow shares 75 raised or lowered.

As shown in Fig. 1, the tractor is employed to drive a binder, having a right-hand drive. The binder is connected with or suspended from the coupling pole 56, as hereinabove described. The engine 9 drives the traction wheels 8, thereby advancing the binder which is arranged forwardly of the traction wheels. During this travel the counter shaft 26 drives the stub-shaft 30, and the rotation of this stub-shaft is transmitted to the binder shaft 70, and rotates the same. The binder shaft 70 drives the cutter 67.

When it is desired to employ a left-hand drive binder in connection with the tractor the coupling pole is clamped within the left-hand tube 54, and the binder is secured to the coupling pole, as hereinbefore described, and its driving shaft 72 inserted within the socket 33 of the left-hand stub-shaft 30.

When it is desired to use the tractor in connection with a gang of plows, as shown in Figs. 5 and 6, the binder is disconnected from the coupling pole, the coupling pole withdrawn from the forward end of the tubular sleeve 42 and inserted in the rear end thereof, thereby bringing the coupling pole and steering wheels to the rear of the traction wheels. The gang of plows 74 are then arranged rearwardly of the traction wheels and the arms 78 connected with the axle 7. The two-part clamp 82 is then secured to the coupling pole. The plow shares may be raised and lowered by proper manipulation of the lever 85.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. Apparatus of the character described, comprising a frame, traction wheels to support and propel the frame, a prime mover carried by the frame to drive the traction wheels, a pair of sleeves secured to the frame near its opposite sides, a steering unit, a coupling pole connected with the steering unit and adapted to be held within either of the sleeves, a counter shaft carried by the frame and driven by the prime mover, and means for connecting either end of the counter shaft with the operating elements of an apparatus connected thereto.

2. Apparatus of the character described, comprising a frame, traction wheels to support and propel the frame, a prime mover carried by the frame to drive the traction wheels, a pair of sleeves secured to the frame near its opposite sides, a steering unit, a coupling pole connected with the steering unit and adapted to be held within either of the sleeves, a counter shaft carried by the frame and driven by the prime mover, stub-shafts arranged near the ends of the frame and driven by the counter shaft, and driving means for the operating elements of an apparatus connected thereto and adapted to have detachable connection with either stub-shaft in accordance with the same being a right or left hand drive.

3. A tractor of the character described, comprising a frame, traction wheels to support and propel the frame, a prime mover carried by the frame to drive the traction wheels, a pair of sleeves secured to the frame near the opposite sides thereof, a steering unit, a sleeve secured to the steering unit, a coupling pole having one end adjustably mounted in the sleeve of the steering unit and its opposite end adapted to be adjustably mounted in either sleeve of the frame, and means carried by each sleeve to lock the coupling pole thereto in adjustment at a desired position.

4. A tractor of the character described, comprising a frame, traction wheels to support and propel the frame, a prime mover carried by the frame to drive the traction wheels, a sleeve carried by the frame and having its opposite ends open, a steering unit, a sleeve carried by the steering unit, and a coupling pole having one end secured within the sleeve of the steering unit and its opposite end adapted for insertion within either end of the sleeve of the frame whereby the coupling pole may be arranged forwardly or rearwardly of the traction wheels.

5. A tractor of the character described, comprising a wheeled frame, means to propel the wheeled frame, a coupling pole connected with the wheeled frame, an annular bolster, a sleeve rigidly secured to the annular bolster and adapted to receive the end of the coupling pole, horizontally swinging spindles pivotally connected with the annular bolster, means to swing the spindles in a substantially horizontal plane, and wheels rotatably mounted upon the spindles.

In testimony whereof I affix my signature in the presence of two witnesses.

LEONARD BROWN.

Witnesses:
ETHEL WRIGHT,
AVA B. LAPP.